(No Model.)
H. W. RIGHTMYER.
GUIDE CLAMP FOR STONE SAWING MACHINES.
No. 530,242. Patented Dec. 4, 1894.
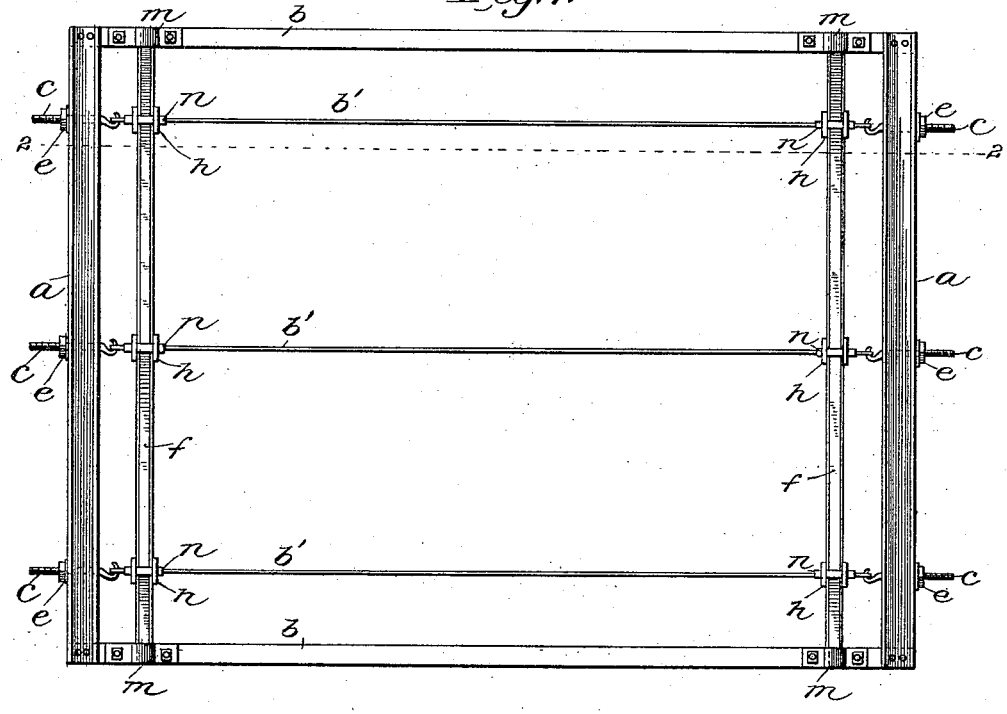
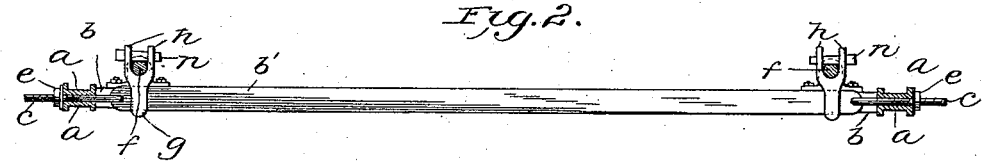
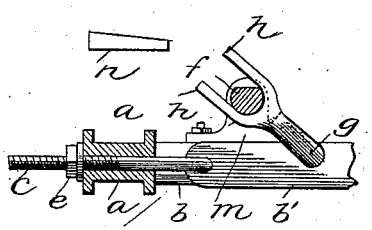 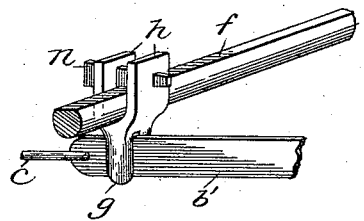

UNITED STATES PATENT OFFICE.

HOMER W. RIGHTMYER, OF TAUGHANNOCK FALLS, NEW YORK, ASSIGNOR TO GENEVIEVE M. RIGHTMYER, OF SAME PLACE.

GUIDE-CLAMP FOR STONE-SAWING MACHINES.

SPECIFICATION forming part of Letters Patent No. 530,242, dated December 4, 1894.

Application filed October 28, 1893. Serial No. 489,356. (No model.)

*To all whom it may concern:*

Be it known that I, HOMER W. RIGHTMYER, a citizen of the United States, residing at Taughannock Falls, in the county of Tompkins and State of New York, have invented certain new and useful Improvements in Guide-Clamps for Stone-Sawing Machines; and I do hereby declare the following to be a full, clear, and exact description of the invention, such as will enable others skilled in the art to which it appertains to make and use the same.

In stone sawing machines of the reciprocating type, it is customary to arrange the gang saws at suitable distances apart within a skeleton frame mounted in such manner as to be reciprocated by hand or power. The distance at which the saws are spaced with respect to each other depends upon the thickness of the slabs into which the stone is to be cut, and as this varies with circumstances, provision is made for shifting the saws from or toward each other, and for removing such of the saws as are not needed for the particular work in hand or for adding more saws when a greater number are required. In order to secure this adjustability and ready removal and replacing of the saws within the frame, the saws are usually each provided with apertures at their ends and hooked rods engage within said apertures and connect the saws with the frame by passing through slots or grooves in the end bars of the frame. The outer ends of these rods are screw-threaded and provided with nuts, so that by tightening up the nuts the saws are put under the proper strain or tension, after being adjusted at the desired distance apart, and parallel to each other. It is also of the greatest importance that the saws should be constantly maintained during the sawing operation parallel to each other and in the same planes in which they are originally set, so that there may be no deviation in the cut and no danger to the saws from buckling and breaking.

My invention relates to a specific means for securing this result, by the employment of removable clamp guides of such construction that they may be slipped into place and applied to the individual saws, after the saws are put under tension and set in position, and may be as readily removed from any individual saw, when, for any reason it is desired to remove, adjust, or replace such saw without disturbing the remaining saws of the gang.

In the accompanying drawings, Figure 1 represents a plan view of the saw-frame of a stone-sawing machine embodying my improvements. Fig. 2 represents a sectional elevation thereof taken on a plane indicated by the line 2—2 of Fig. 1. Fig. 3 represents, in detail, the operation of slipping the clamp guide in place upon the saw, the parts being shown partly in section; and Fig. 4 represents a detail perspective of the clamp guide, its rod, and the proximate end of one of the saws.

Similar letters of reference indicate similar parts throughout the several views.

Referring to the drawings, A indicates the saw-frame, which may consist conveniently of channel bars $a$ and connecting stringers $b$ connected in such manner as to leave continuous transverse slots or recesses between the channel bars $a$. The saws $b'$ may be provided at their ends with apertures into which engage the tension rods $c$, which are adapted to pass through the slots, and to be engaged by some device for putting tension upon the saws, as, for instance, nuts $e$ fitting upon the threaded outer ends of the rods $c$. The saws being placed within the frame are adjusted at the proper distances apart and parallel to each other and put under tension by the nuts $e$. In order to maintain them in this position, I arrange above them, and preferably at opposite ends of the frame, a bar $f$, flattened upon its upper surface and rounded below as shown, and in connection with this bar I employ my removable clamp guides.

The clamp-guides consist of yoke-shaped pieces, preferably metallic castings, having a slotted tang $g$, adapted to fit snugly over the sides of the saw and having the uprights $h$, which are perforated for the reception of the clamping key or wedge $n$.

As indicated in Fig. 3, the clamp-guides are placed in position upon the saws by tilting said guide so as to bring one of the uprights $h$ beneath the clamping-bar $f$ and so as to bring the slotted tang to straddle the saw blade.

The guide is then brought to the upright position and the wedge $n$ is driven in, as indicated in Figs. 1, 2, and 4, thereby firmly clamping the guide upon the bar $f$, and holding the saw against any possibility of deviating from the plane in which it was originally set. When it is desired to remove or replace a saw, the guide can be at once removed by knocking out the key $n$ and tilting the guide in the reverse direction until it is completely disengaged.

It will, of course, be understood that the clamp-bar $f$ is to be connected to the saw frame in such manner as to be relatively fixed with respect thereto, for instance, by means of straps or bearings $m$ within which said bar has no longitudinal movement or movement of rotation.

Having thus described my invention, what I claim is—

1. A clamping device for stone saws, the same consisting of a fixed guide rod, a clamp adapted to slide lengthwise on and rock transversely of said rod, and means for securing the clamp to the rod in different positions of adjustment along the same, said clamp-securing means being adapted and constructed to permit the detachment of the clamp from the rod; substantially as described.

2. A clamping device for stone saws, the same consisting of a fixed guide rod, a forked or yoke-shaped clamp straddling the guide rod and having a slotted tang to receive the saw, said clamp being adapted to slide and rock on the guide rod, and a key or wedge adapted to be driven into apertures in the uprights of the clamp to secure the same in different positions of adjustment along the rod; substantially as described.

3. A clamping device for stone saws, the same consisting of a fixed guide rod having a flattened surface, a forked or yoke-shaped clamp straddling the guide-rod and having a slotted tang to receive the saw, said clamp being adapted to slide and rock on the guide rod, and a key or wedge adapted to be driven into apertures in the uprights of the clamp to secure the same in different positions of adjustment along the rod, the key or wedge co-operating with the flattened surface of the rod to bind the clamp to and prevent its turning on the rod; substantially as described.

In testimony whereof I affix my signature in presence of two witnesses.

HOMER W. RIGHTMYER.

Witnesses:
JOHN C. PENNIE,
J. A. GOLDSBOROUGH.